United States Patent
Wesson

(10) Patent No.: US 6,371,636 B1
(45) Date of Patent: Apr. 16, 2002

(54) LED LIGHT MODULE FOR VEHICLES

(75) Inventor: Bruce Wesson, Newton, MS (US)

(73) Assignee: Jam Strait, Inc., Newton, MS (US)

(*) Notice: Subject to any disclaimer, the term of this patent is extended or adjusted under 35 U.S.C. 154(b) by 0 days.

(21) Appl. No.: 09/578,813

(22) Filed: May 24, 2000

Related U.S. Application Data

(60) Provisional application No. 60/135,797, filed on May 24, 1999.

(51) Int. Cl.$^7$ .................................................. F21S 8/10
(52) U.S. Cl. ..................... 362/545; 362/541; 362/543; 362/544; 362/549
(58) Field of Search ................................ 362/800, 543, 362/544, 545, 549, 826, 235, 236, 240, 249, 498, 500, 542, 540, 541, 499

(56) References Cited

U.S. PATENT DOCUMENTS

| | | | | |
|---|---|---|---|---|
| 4,211,955 A | * | 7/1980 | Ray | 315/53 |
| 5,160,200 A | * | 11/1992 | Cheselske | 362/249 |
| 5,160,201 A | * | 11/1992 | Wrobel | 362/249 |
| 5,806,965 A | * | 9/1998 | Deese | 362/249 |
| 5,921,660 A | * | 7/1999 | Yu | 362/249 |
| 5,947,588 A | * | 9/1999 | Huang | 362/235 |
| 6,220,722 B1 | * | 4/2001 | Begemann | 362/231 |
| 6,234,648 B1 | * | 5/2001 | Börner et al. | 362/235 |

\* cited by examiner

*Primary Examiner*—Sandra O'Shea
*Assistant Examiner*—Ismael Negron
(74) *Attorney, Agent, or Firm*—Garvey, Smith, Nehrbass & Doody, L.L.C.; Seth M. Nehrbass

(57) ABSTRACT

A Light Emitting Diode Lamp Module for specific use in all vehicle tail, brake or turn signal lamp fixtures for integrated single and dual element operation. The module has integrated dual element control circuitry, voltage and current control circuitry, brightness enhancement circuitry, and LED circuitry built into the universal body to produce a bright, reliable, long life, energy efficient LED lamp that fits all vehicles.

16 Claims, 7 Drawing Sheets

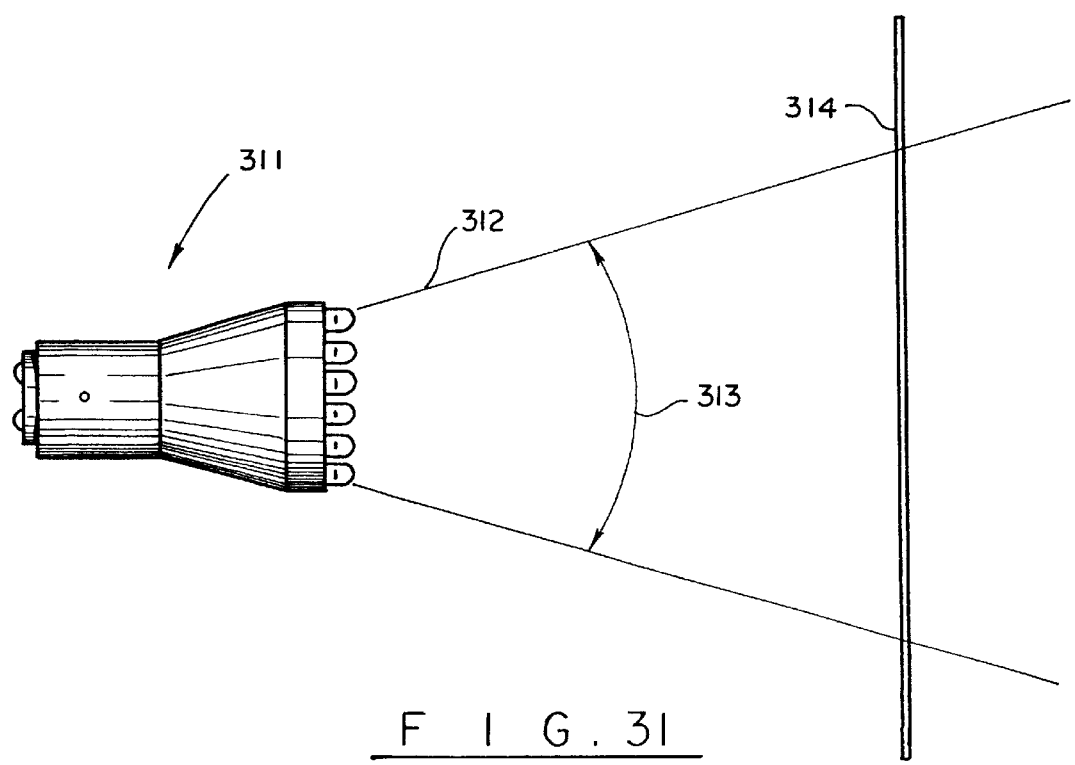
F I G . 31
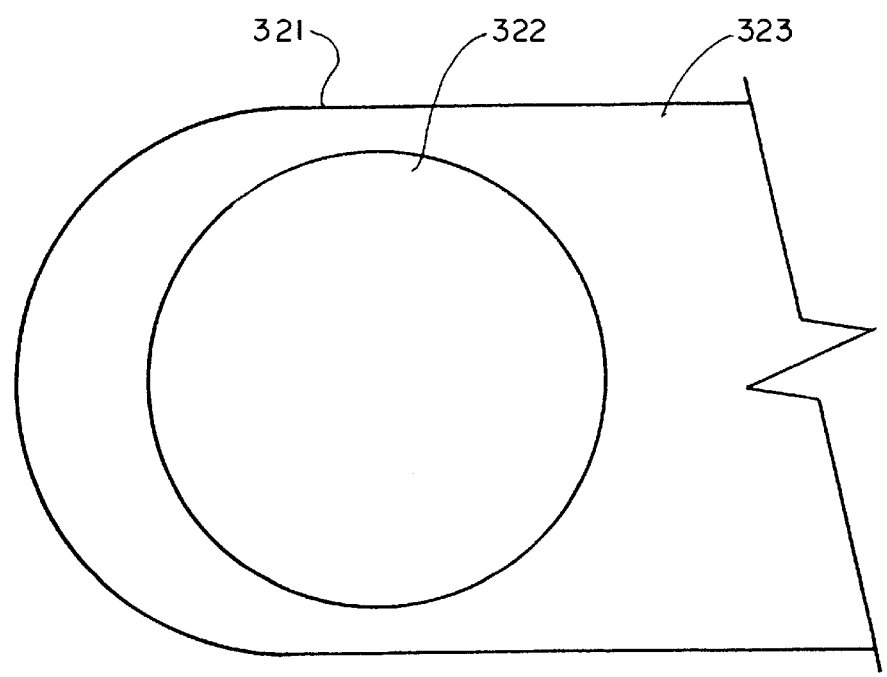
F I G . 32

LED LIGHT MODULE FOR VEHICLES

This application claims priority of copending, provisional patent application No. 60/135,797 filed May 24, 1999.

BACKGROUND OF THE INVENTION

1. Field of the Invention

The present invention relates generally to lamps for motor vehicles and more particularly to direct current light-emitting diode (LED) lamps and more particularly to LED lamp modules containing control circuitry for producing light of high intensity usable as a tail, brake, or turn signal lamp.

2. Background

The features of the present invention are particularly useful as applied to the construction of LED lamp modules to replace incandescent lamps used in automobiles and other motor vehicles and are applicable to the manufacture of LED replacement bulbs for both single filament and dual filament incandescent bulbs. LED's typically operate at voltages between 1.7 and 2.2 volts. Overvoltaging and overheating of LED's result in significant degradation of the performance and lifetime of LED's. One well known type of existing incandescent lamp generally employs a type S-8 glass bulb cemented in a double-contact brass bayonet base. A second type of incandescent lamp has a similar bulb inserted into an insulated plastic wedge base that is adapted to fit into a corresponding plastic socket. A type of incandescent bulb with a wedge base is described in U.S. Pat. No. 4,603,278 (Devir et al.). Incandescent vehicle signal-lamp bulbs consume a relatively large amount of power, generate a large amount of heat and have a relatively short life.

LED bulbs designed to replace vehicle incandescent bulbs require bases similar to the standard bayonet or the wedge bases. To be effective an LED bulb must be adapted to produce an intense light when viewed by the human eye and must provide for effective heat dissipation to avoid impairing the LED's. It also must be designed to operate within the range of voltages present in motor vehicles so as to not over-voltage the LED's. Finally, some models of motor vehicles ground the brake circuit when the brake is not activated to prevent any accidental activation of the brake lights; accordingly, an effective LED bulb designed to replace a dual filament bulb must contain circuitry enabling the LED's to be activated with either the tail lamp circuit or the brake light circuit.

One approach to solving the problems of cooling the LED's is given in U.S. Pat. No. 5,632,551 (Roney et al.) which describes an LED bulb as used in truck trailers and/or tractors. The LED's are mounted on a printed circuit board (PCB). The LED's are embedded in resin to facilitate the conduction of heat away from the LED's so that the heat will not cause the LED's to degrade and lose brightness. This bulb is not designed to fit in standard automotive lamp sockets.

A second approach to the cooling problem is given by U.S. Pat. No. 5,575,459 (Anderson) which describes an AC LED bulb that uses air holes to provide air circulation and cooling for an LED bulb. This bulb is not suitable for motor vehicle use.

U.S. Pat. No. 6,045,240 (Hochstein) presents a third solution to the problem of cooling the LED's by teaching the use of a heat sink to cool an LED array. This is not a bulb, but a lamp assembly; therefore it is not suitable for replacing an incandescent light bulb.

One type of LED bulb with a wedge base is described in U.S. Pat. No. 5,160,200 (Cheselske). It provides a parallel string of LED's soldered and rolled up for 2-volt dc operation. The roll is placed in a housing with two leads extending out the wedge type base. No provisions are made for 12-volt operation, dual element operation, voltage control, heat dissipation, or brightness enhancement. The wedge is not suitable for motor vehicle wedge type sockets, because it differs in size and shape from the automotive standard. Additionally, it does not have the required fasteners for motor vehicle applications. It is also limited in the number of LED's which may be contained and therefore the brightness because of the cylindrical shape specified for the body. A funnel shaped body is more desirable for automotive applications. Typical LED's are 1.7 to 2.2 volts dc. If this bulb were connected to vehicle voltage of 12 to 14 volts dc, the LED's will burn out.

U.S. Pat. No. 5,947,588 (Huang) describes an LED bulb where an LED array is mounted on a printed circuit board which is in turn mounted on a standard automotive bayonet type base. The LED's are directly connected to the electrical contacts on the bayonet base. The patent shows an embodiment of the bulb to replace a dual filament bulb. The patent does not describe the circuit connections of the LED's to the contacts, but either the LED's are grouped into two sets-one for use as tail lights and a second for use as brake lights—or the LED's are connected in parallel so that all LED's are illuminated when either the tail light or the brake light circuit is energized. If the LED's are grouped in the two sets then all of the LED's cannot be energized at once resulting in dimmer tail light and brake lights. On the other hand, if the circuits are connected in parallel so that all LED's would be energized if either tail lamp or brake lamp circuit were energized, the array would not work as tail lamps in automobiles in which the brake lamp is grounded when the brake is not activated. Also, if this configuration did work in some vehicles, the tail lamps and the brake lamps would be illuminated with equal intensity, that is the brake lights would not be brighter. The patent discusses the problem of low intensity by suggesting the addition of more LED's; this would make the array larger than a standard incandescent lamp which in turn would result in the LED lamp being unable to fit into many tail lamp assemblies. Also, this configuration of LED bulb will not fit into many recessed automotive sockets and lamp assemblies.

Voltage varies from vehicle to vehicle from a low of 10-volts to high of 14.5 volts. In the LED bulb of U.S. Pat. No. 5,947,588, the LED's will dim in low voltage situations or worse, burn out in over voltage situations, both of which are undesirable. No means is provided for controlling the voltage and current. This lack of control causes the brightness to vary according to the vehicle voltage. It is well known that most vehicles' batteries are 12-volts dc when fully charged. They are less than 12 volts when undercharged. Most vehicles charging systems produce in excess of 12-volts dc and typically between 13 and 14 volts. With applied voltage spread evenly divided across a plurality of LED's in the instant bulb without control circuitry there will be a very noticeable difference in brightness at low voltage situations and in over voltage condition on the LED's at the higher voltage extreme. Whereas incandescent bulbs are not susceptible to damage due to said over voltage situations nor do they dim down excessively at under voltage conditions, LED's by nature lose brightness disproportionately to the reduced voltage when operated below their typical specified operating voltage. On the other hand, LED's can only handle their specified maximum voltage without degradation or failure.

It is desirable to produce a light bulb that has a plurality of light-emitting diodes (LED's) which can be illuminated all at once and in a controlled way so as to have a different brightness for brake and tail light applications connected to a conventional bayonet or plastic wedge-type base so as to replace conventional single or dual filament incandescent bulbs. Neither U.S. Pat. No. 5,160,200 (Cheselske) nor U.S. Pat. No. 5,947,588 (Huang) provide a way of controlling the brightness of the LED array in different applications.

SUMMARY OF THE INVENTION

It is an object of the present invention to provide an LED replacement bulb for incandescent light bulbs, which is adapted for use in all standard vehicle sockets.

It is further an object of the present invention to provide an LED replacement bulb for incandescent light bulbs, which will protect the LED's from degradation due to overheating.

It is further an object of the present invention to provide an LED replacement bulb for incandescent light bulbs, which will protect the LED's form degradation due to overvoltage or excess current.

It is still further an object of the present invention to provide an LED replacement bulb for incandescent light bulbs, which will give greater brightness as sensed by the human eye.

It is further an object of the present invention to provide an LED replacement bulb for incandescent light bulbs with integrated dual element control of the entire plurality of LED's.

It is further an object of the present invention to provide an LED replacement bulb for incandescent light bulbs with integrated dual element control of the entire plurality of LED's.

It is further an object of the present invention to provide an LED replacement bulb for incandescent light bulbs with a means for pulsating the LED array so as to increase brightness output, reliability, and life expectancy while reducing energy consumption, heat, and resulting degradation of the LED's.

It is further an object of the present invention to provide an LED replacement bulb for incandescent light bulbs that has no ramp-up time for light intensity as the incandescent bulbs have.

It is still further an object of the invention to provide a bulb to employ a standard bayonet and wedge base for easy and cost effective production.

These and other objects, advantages, and features are attained, in accordance with the principles of this invention by an LED array connected to control circuitry. In one embodiment, a replacement for a dual filament bulb, the problem of controlling the intensity of the light emitted by the array is solved by having a first resistor in series with the array connected to the tail light connection on the bulb base. This controls the intensity and prevents overvoltaging and overheating by controlling the voltage and current to the array. A second resistor and a diode are connected in series with the array to the brake light connection on the bulb base. The diode prevents the array from being grounded when the brake light connection is grounded in some vehicles, while the second resistor provides for a higher voltage and current to be applied to the LED array resulting in greater intensity of the emitted light.

Another embodiment solves the problems of controlling the brightness of the LED array by energizing the LED's with a series of pulses of higher voltage but short duration. For a pulse frequency of 50 Hz or greater the human eye, due to persistence of the image, will see the pulse as a constant intense light. The individual pulses of light have much higher intensity than when a constant voltage is applied to the LED array. However, since the pulses are of very short duration, the total power consumption is less than with a constant voltage solving the problem of overheating the LED's. The pulse circuitry also prevents the degradation of the LED's due to over-voltage by controlling the duty cycle appropriately.

In order to provide a universal replacement for incandescent vehicle bulbs they are packaged in a configuration that mimics the size and shape of the original bulb. Other provisions in the design provide for cooling of electronics and use with a standard bayonet or wedge base as are found on bulbs.

The present invention is a unique light emitting diode vehicle lamp module adapted for mounting in standard vehicle brake/tail lamps or turn signal assemblies to replace standard vehicle incandescent bulbs. The invention features universal vehicle fit, integrated dual element control, voltage and current regulation, brightness, enhancement circuitry, improved energy efficiency, and longer life expectancy. It features a base adapted to fit a standard vehicle lamp assembly and further adapted to make electrical connection with said brake/tail lamps or turn signal assembly, circuitry electrically connected to said base to control and enhance brightness a plurality of light emitting diodes, a light emitting diode cluster mounted on a printed circuit card or otherwise electrically connected and mounted in a wedge or bayonet base which encases the said control and brightness circuitry so said light emitting diodes illuminate when an electrical signal is applied to said motor vehicle lamp assembly and where said light emitting diode cluster is aligned to shine directly through the lens of the tail lamp or turn signal assembly. The present invention differs from the prior art in that all LED's are illuminated for both tail and brake light circuits, but with different controlled light intensities.

BRIEF DESCRIPTION OF THE DRAWINGS

FIG. 31 is a side view of a typical viewing angle of the light beam of the present invention.

FIG. 32 is a rear view of a typical vehicle brake/tail/turn lamp assembly showing the intense light pattern on the lens.

DESCRIPTION OF THE PREFERRED EMBODIMENTS

Although specific embodiments of the present invention will now be described with reference to the drawings, it should be understood that such embodiments are by way of example only, and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
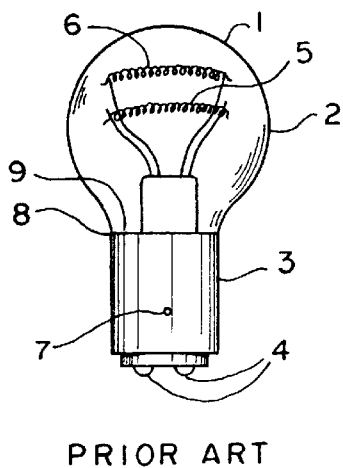
FIG. 1 is a perspective view of a bayonet base electric incandescent lamp typically used in vehicles.

In order to understand the preferred embodiments an examination of some prior art is useful. FIG. 1 illustrates a standard incandescent type automotive bulb 10 with a bayonet base that has been used for many years. The incandescent bulb comprises a glass envelope 1, of standard one-inch width at its widest point 2, attached to a standard electrically conducting base 3. The base has electrical contacts 4, which are electrically connected to a tungsten brake filament 5 and a tungsten tail filament 6 respectively which are in turn grounded through the electrically conducting base 3. Except for ground, the said filaments are electrically isolated, as are the power inputs to the bulb. The brake lamp filament is brighter and draws more electrical current than does the tail lamp filament. The base has a plurality of index pins 7 for aligning and securing the bulb into a bayonet type socket. The angle 8 between the standard base and the glass envelope is typically about 150 degrees to enable the bulb to fit into a standard lamp socket. The widest point 2 of the envelope 1 is approximately 0.7 inches above the top 9 of the base.

Figure 2:
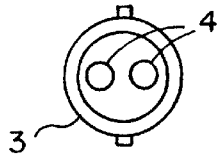
FIG. 2 is bottom view of a standard dual element, bayonet base bulb.

FIG. 2 is bottom view of the dual filament bulb of FIG. 1 with brake and tail electrical connections 21.

Figure 3:
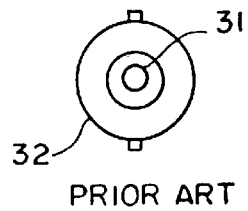
FIG. 3 is bottom view of a standard single element, bayonet base bulb.

FIG. 3 is a bottom view of a single filament bulb similar to the bulb of FIG. 1, with a single electrical connection 31.

Incandescent lamps all have inherent problems or limitations due to the nature of their operation. The tungsten filaments 5 and 6 shown in FIG. 1 for incandescent bulbs typically burn out after approximately 2,000 hours of usage. Because of this, they are relatively unreliable by today's solid state standards. It takes time, effort, and money to replace the blown bulbs. If not replaced, blown bulbs can impair the safe operation of vehicle. Additionally, the bulbs consume a great deal of electric energy and generate a lot of heat. LED bulbs are more energy efficient and generate much less heat.

The filaments operate in an inert gas in the glass envelope. When the contacts 4 are connected to power, electricity flows through the filaments causing them to heat up and glow brightly. The glow is not instantaneous, but it takes time for the filaments to heat up.

The filaments in dual element incandescent vehicle brake/tail lamps are electrically insulated from each other. The circuit for each filament is typically separately wired, fused and grounded. In many vehicles, the brake signal is taken to ground when inactive for safety reasons which is a problem for prior art LED bulbs.

Figure 4:
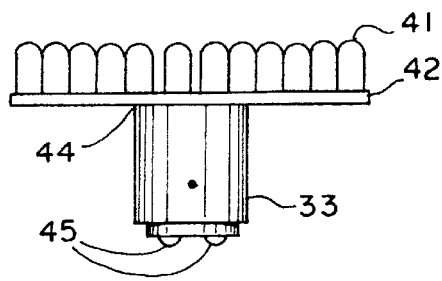
FIG. 4 is a perspective view of a prior art LED lamp for automotive use in bayonet base type sockets.

FIG. 4 depicts a prior art LED replacement bulb of U.S. Pat. No. 5,947,588 (Huang). As described, electrical contacts 45 connect by means of wires or other conventional means directly to the LED's 41 mounted upon printed circuit board (PCB) 42. Although not explained in the patent, the only way to provide for dual element operation in FIG. 4 is to either split the plurality of LED's between taillight and brake light thus limiting the brightness of each or to run both circuits in parallel. If wired together in parallel the LED's will be equally bright for tail as it is for brake providing no distinction between the two. This does not conform to normal standards for vehicle operation. Adding additional light emitting diodes to LED's 41 will only limit the applications it will fit due to size restrictions of the width of the bulb, in this case the PCB 42. Using smaller LED's such as size T1 or SMT in larger quantity within the same space will not improve the situation because the maximum rated brightness of these is less.

The FIG. 4 bulb will fit in applications where the described hollow lens can be removed to replace the bulb and where there is adequate space provided at the top of the metal cylindrical bulb base 44 for a large enough group of LED's 41 for adequate brightness for vehicle applications, such as in motorcycles, older automobiles and boat trailers. However, there are many other applications where this bulb will not fit and still effectively operate due to space restrictions resulting from the provided connection of the LED PCB 42 directly to the metal cylindrical bulb base 44.

Figure 5:
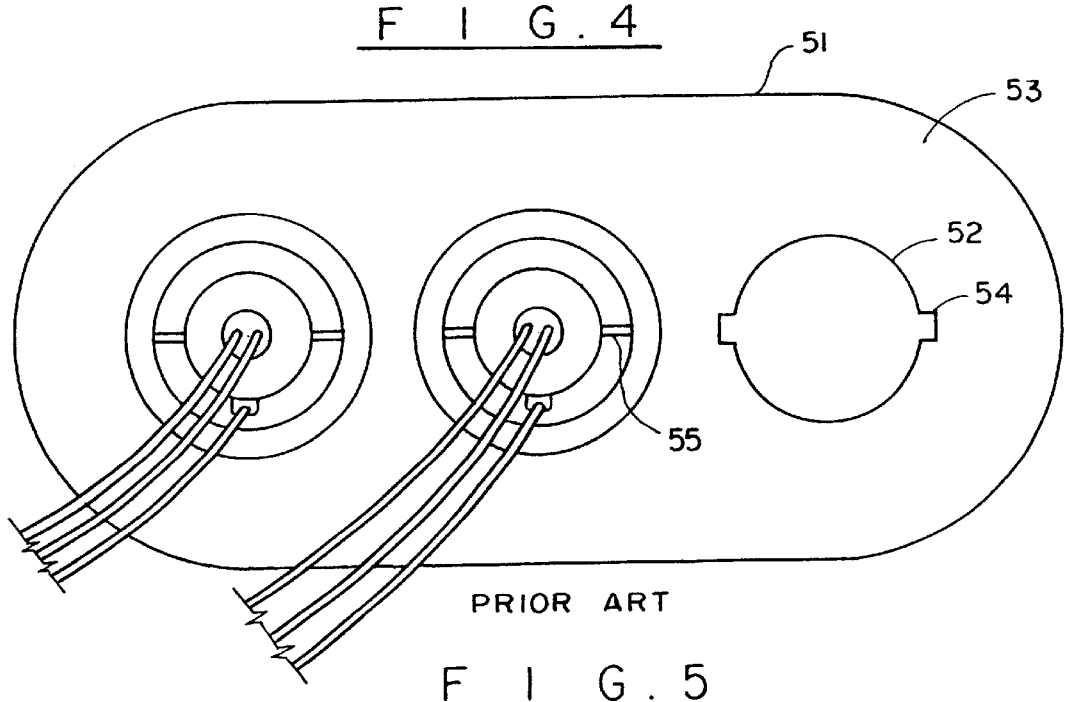
FIG. 5 is view of a typical trunk accessible vehicle brake/tail/turn lamp assembly from inside of trunk facing the rear of the vehicle.
Figure 6:
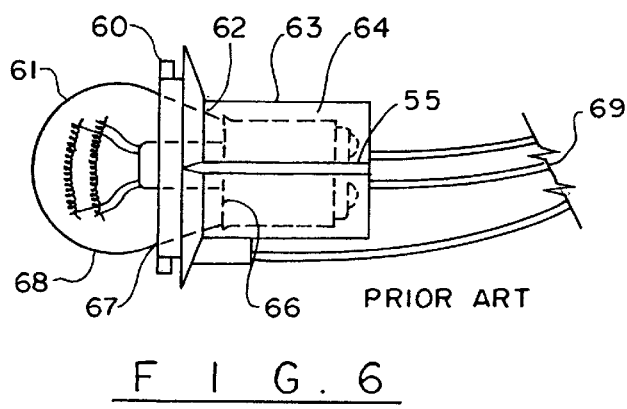
FIG. 6 is a side view of a typical trunk mounted recessed bulb socket showing a standard incandescent bulb installed.

Referring now to FIG. 5 and FIG. 6, most newer vehicles brake, tail, and turn signal bulbs are installed from within the trunk per FIG. 5. In these applications, the lamp assemblies 51 provide for bulb installation through one-inch diameter holes 52 in the reflectors 53 with slots 54 for the ¼ turn locking tabs 60 found on recessed bulb socket 63. The reflectors 53 are sealed to the opposite amber or red lenses.

The recessed bulb sockets of FIG. 6 are inserted into hole 52 of the lamp assemblies. The sockets contain an incandescent lamp where a portion 62 of the glass envelope 61 is in the recessed bulb socket 63. The bayonet base 64 is completely submerged in the socket along with part of the length of the glass envelope 61. The wings 55 on the socket enable easy ¼ turn installation into the assembly 51. The available side clearance around the top of the base 66 in these applications is nearly zero. Significant bulb clearance is provided outside the neck 67 of the socket; of which the widest point 68 of the envelope is approximately up to 0.7 inches out from the top of the base 66, counting the extra distance required for depressing for installation and de-installation. In these applications, the base 43 of the prior art of FIG. 4 would not reach the contacts because the bulb width determined by PCB 42 being at the top of the base 44 would block installation unless the diameter of PCB 42 is equal to or less than the top of the base 44. If that were so, it would be swallowed up as the base 64 shows and it would be virtually impossible to remove it without a special made tool. It would also be restricted in number of LED's 41 in FIG. 4 to provide adequate light intensity.

Figure 7:
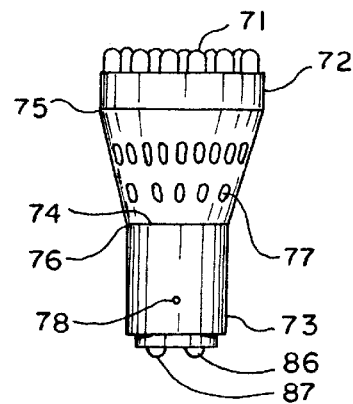
FIG. 7 is a perspective view of a first embodiment of the present invention showing an LED bulb which will fit into all standard automotive lamp sockets.
Figure 8:
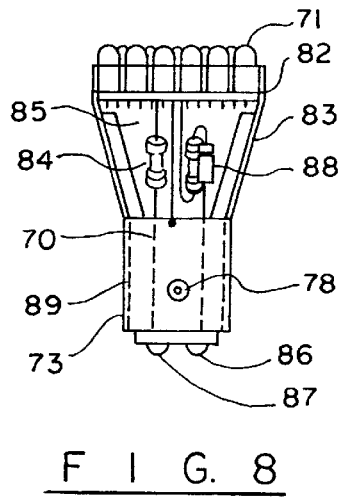
FIG. 8 is a view of the first embodiment, partially in section, showing control circuitry suspended in the body of the LED bulb.

The first preferred embodiment illustrated in FIG. 7 and FIG. 8 provides for a light emitting diode vehicle lamp module with integrated dual element control, voltage and current control, and means for heat dissipation. It is universally adapted for mounting in standard vehicle brake, tail, or turn lamp assemblies to replace the incandescent brake/tail/turn lamp bulb.

The first embodiment comprises a standard metal bayonet base 73 adapted to fit standard vehicle recessed bayonet lamp socket as in FIG. 6. Body 72 replicates the geometry of the incandescent bulb FIG. 1 so as to fit into a recessed lamp socket of FIG. 6. The body contains body cavity 85 and is funnel shaped with the small end 89 fitting down into opening 70 in base 73. From the top 74 of the base 73, the body tapers outward as it extends a length of 0.7 inches reaching a maximum diameter of approximately one inch, where the said body has a constant diameter and extends about 0.2 inches to encase a plurality of LED's 71 in the large end 75. The angle 76 of the body taper with respect to the base 73 is essentially the same as the angle 8 of the incandescent bulb in FIG. 1. This design of the body allows installation in all vehicle brake/tail/turn applications including recessed ones such as FIGS. 5 and 6 where prior art FIG. 4 will not fit.

Base 73 is adapted to make electrical connection via contacts 86 and 87 with said brake, tail, or turn lamp assembly with dual element control circuitry 84 connected to said contacts and to a plurality of LED's 71 so as to electrically control said diodes. The LED's 71 are mounted on a printed circuit board 82, which is electrically connected to the control circuitry. The LED's 71 are mounted in body 72 so said light emitting diodes 71 illuminate when an electrical signal is applied to said motor vehicle lamp assembly.

The dual element control circuitry 84 provides for the cooperation of the entire plurality of LED's 71 for integrated simultaneous tail and brake indication where brake produces near full brightness, tail produces about half brightness and both together produce 100% full brightness. The dual element control circuitry 84 also provides for proper operation of tail by a blocking diode 88 such as 1N4005 when the vehicle's brake input signal is taken to ground as described previously.

Voltage and current are controlled with circuitry 84 to provide a relatively constant voltage and current to each LED to maintain reliability, prevent degradation, and maintain brightness during vehicle voltage swings of 10–14.5 volts dc.

Heat dissipation is required to maintain brightness of the LED's over time. The first embodiment shown in FIG. 8 accomplishes this by locating the heat producing control circuitry 84 away from the LED's 81 by suspending them in open air in the body cavity 85 of the body 83 with ventilation holes 77 for maximum convection air cooling.

Figure 9:
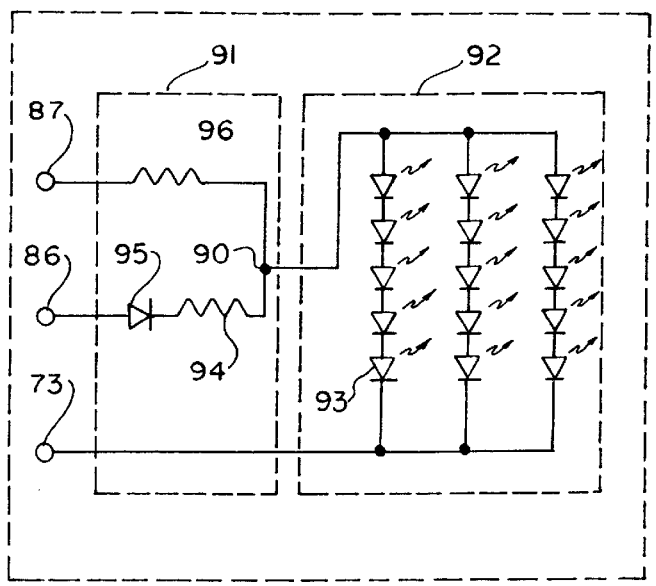
FIG. 9 is a schematic diagram of the control circuitry and LED array.

Referring now to FIG. 9, wherein the control circuitry of FIG. 8 is set out in detail. The plurality of LED's 71 are wired together in parallel series strings in LED circuit 92 especially to consume most of the applied voltage to minimize total heat loss and maximize energy efficiency while allowing enough voltage to drop across the control circuitry 91 to enable effective voltage and current regulation of each LED 93. Contact 87 is for tail lamp input. Specific series power resistor 96 consumes the remaining voltage and limits the current to the LED circuit 92 for the correct tail lamp brightness. Terminal 86 is the contact for brake lamp input. It has a series diode 95 and specific series power resistor 94. The diode 95 blocks the tail voltage at contact 87 from going to ground when brake lamp is off and tail lamp is on in certain vehicles. The series power resistor 94 consumes the remaining voltage not consumed by the diode 95 and the LED circuit 92 and regulates the voltage and current to each specific LED 93. The brake/turn and tail lamp signals are connected at 90 between the control circuit 91 and LED circuit 92. The return side of the LED circuit 92 is connected to the metal standard base 73 that is connected to vehicle ground in the socket 63 via wires 69 (FIG. 6) completing the circuit.

The entire plurality of LED's 92 shine at near full brightness for Brake/Turn with 12 volts at contact 86 and significantly less brightness for tail with voltage at 87. If both brake/turn 86 and tail signals 87 are provided simultaneously the control circuit will allow total brightness of the plurality of LED's 92 to be full brightness. Specific design values for circuitry and LED's provide minimal brake intensity increase and decrease when tail is switched on and off. Determining such would be obvious to one skilled in the art.

Disconnecting of resistor 96 from contact 87 will allow the circuit to function for single element for tail lamp use. The tail lamp signal is input at contact 87. In the wedge based embodiments the inner two-wire conductors are removed to convert to single element use.

Figure 10:
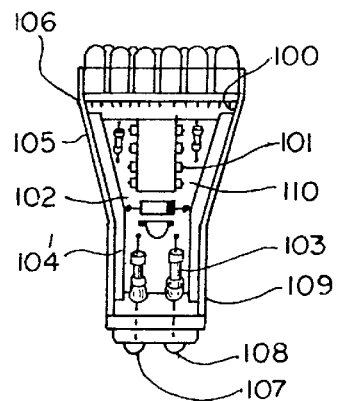
FIG. 10 is a view, partially in section, of a second embodiment showing PCB mounted control and pulse circuitry.
Figure 11:
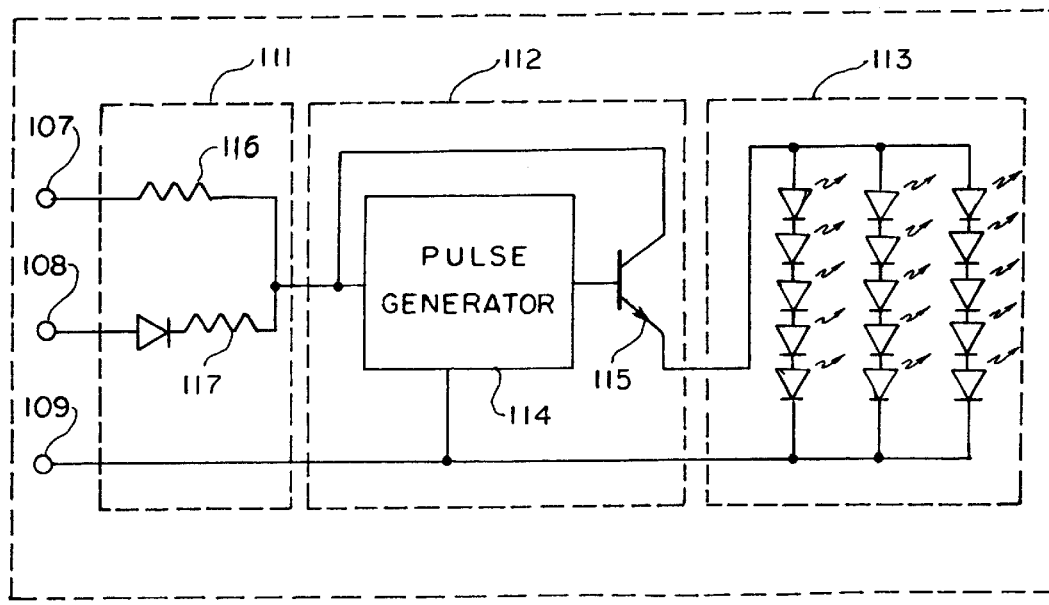
FIG. 11 is a schematic diagram of the control circuitry, pulse circuitry, and LED array contained within the bulb of FIG. 10.
Figure 12:
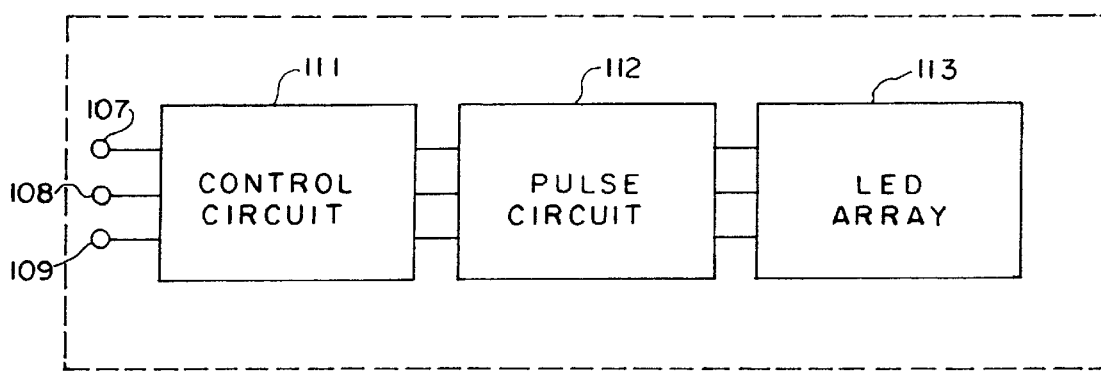
FIG. 12 is a block diagram of the electronic control circuitry, pulse circuitry, and LED array of the second embodiment.

FIG. 10 is a sectional side view of second preferred embodiment. It is identical in shape, fit and operation to FIG. 7, 8, and 9 except it has brightness enhancement circuitry 101 in the body cavity 110 that is mounted on an internal perpendicular circuit card 102 along with the previously described control circuitry 103. The internal circuit card is fitted into vertical slots 104 along the inside wall 100 of the body 105 aligning it for proper connection to the LED circuit card 106 and the brake 108 and tail 107 input connectors on the standard metal bayonet base 109. Referring now to FIG. 11, the input and control circuit 111 is identical to control circuit 91 of FIG. 9 and the LED circuit 113 of FIG. 11 is identical to LED circuit 92 in FIG. 9. The brightness enhancement circuit 112 is electrically connected between control circuit 111 and LED circuit 113. The block diagram of FIG. 12 illustrates the connection between the various elements where control circuit 111 is electrically connected to pulse, or brightness enhancement, circuit 112 which sends controlled pulses of current to the LED array in LED circuit 113 causing the LED array to emit bright pulses of light at a preset frequency. Pulse generator 114 produces a low current pulsating dc voltage signal to the base of the switching transistor 115. Said transistor turns on and off with the input signal producing a voltage to the LED's in LED circuit 113 WIG. 13). The frequency of the pulse 132 is at a high enough rate to provide visual persistence and is seen by the human eye as a steady light. This is typically 50 cycles or pulses per second or higher. The duty cycle or voltage pulse width of pulse 132 is adjusted to provide maximum LED current and brightness for a duration each cycle that will not damage the LED's in LED circuit 113. Constant higher current would cause the LED's in LED circuit 113 to degrade over time and significantly lose brightness but the pulse current will not. The higher pulse current rate can be set at a multiple of the normal current rating of the LED's in LED circuit 113. Therefore, the intensity of the light flashes is much brighter than the normal light intensity, but because of the short duration of the pulse width of pulse 132 versus the in between off time 133, the high current flow is not damaging to the LED's. Typically the current through the LED's in LED circuit 113 is at a much higher rate than the rated maximum value for the LED's. But because it is pulsed and not constant, the LED's will not heat up and degrade if the ratio of on time of pulse 132 to off time 133 is set properly with the values of the current control resistors 116 and 117. The pulsing technology not only allows for brighter than normal operation of the LED's. It also provides for longer life and reliability as the on time is significantly reduced and the total current and heat are reduced.

Figure 14:
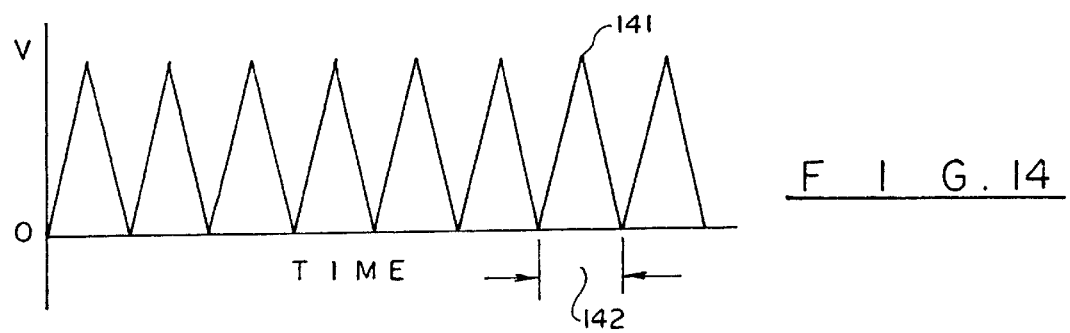
FIG. 14 is a graph of an optional saw-tooth waveform.

An alternate saw-tooth pulsating dc signal is shown in FIG. 14. In this case the voltage and current to the LED circuit 113 are ramped up and down with a predetermined period 142 to provide visual persistency and brighter light than constant dc current allows. Maximum current flows at the time of maximum voltage 141 that exceeds the dc current rating of the LED's. This current value is set in the control circuit 111 to work in cooperation with the pulse circuit to provide maximum brightness without damaging the LED's.

Figure 15:
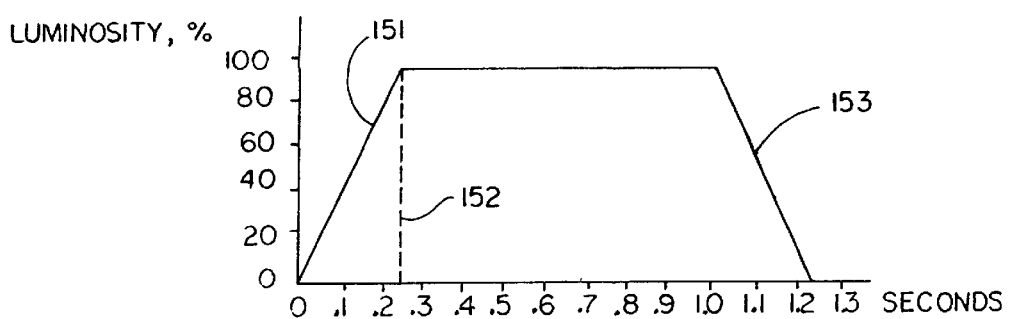
FIG. 15 is a graph of luminosity over time of a standard automotive incandescent brake/tail/turn lamp.

Referring to FIG. 15, it takes time 151 for an incandescent vehicle bulb to heat up and conversely it takes time 153 to cool back down when power is removed. The brightness ramps up to full in about 250 milliseconds (marked at 152 in FIG. 15). So, when a motorist depresses the brake on a vehicle there is a time delay for incandescent brake lamps to glow brightly and alert the following vehicles to the braking condition.

Figure 13:
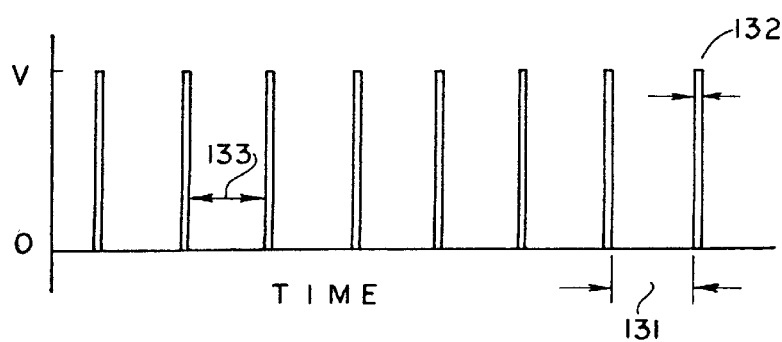
FIG. 13 is graph of the pulsed voltage.
Figure 16:
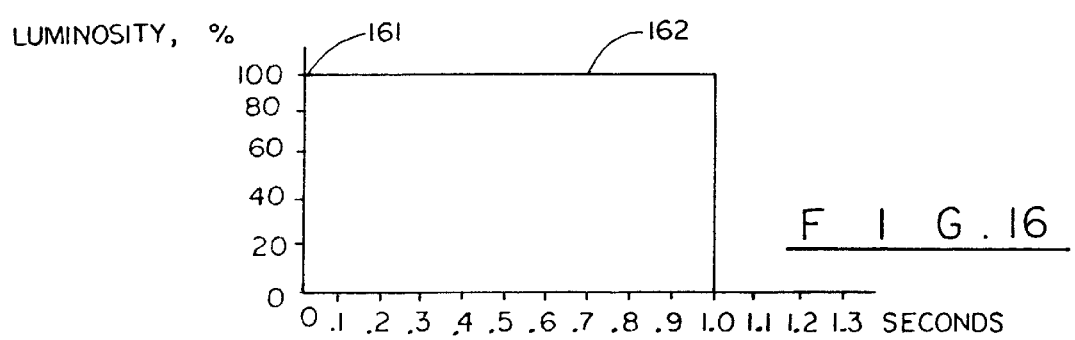
FIG. 16 is a graph of luminosity over time of the present invention.

A graph of the luminosity over time of all of the contained preferred embodiments is shown in FIG. 16 where the LED's are at fall brightness at time zero 161 and produces effects of constant light 162 even with the pulsed voltage in FIGS. 13 and 14. Notably the on time is 250 milliseconds faster than the incandescent bulb (see the graph of FIG. 15) described earlier giving motorists advanced warning of braking conditions with respect to prior art. The quicker on time is more eye catching than the standard incandescent bulb of FIGS. 1 and 19.

Figure 17:
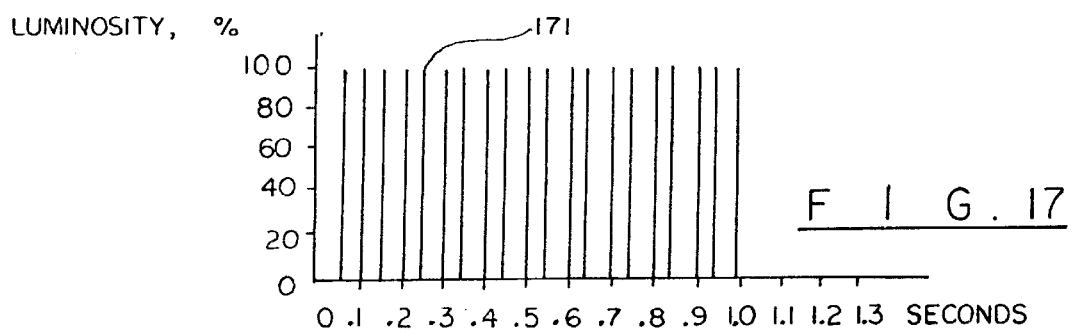
FIG. 17 is a graph of luminosity over time of the present invention with the pulse frequency set for visual strobe effect.

The same second preferred embodiment produces visual light strobes shown in FIG. 17 by slowing the frequency 131 below 50 cycles per second. With the frequency set at 20 cycles per second as graphed in FIG. 17, the LED's will flash 20 times per second. At that rate, the lights will flash 5 times in the same 250 milliseconds (marked at 171 in FIG. 17) it takes an incandescent bulb to ramp-up to full brightness 152 giving advanced warning to motorists of a braking condition. The strobe is more eye catching than steady state incandescent or prior art LED bulbs.

Figure 18:
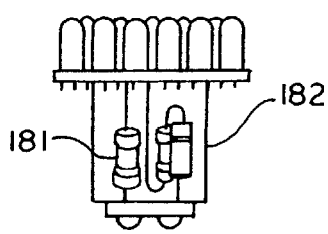
FIG. 18 is a side view partially in section of a third embodiment having suspended control circuitry without a universal fit body.

A side sectional view of the third preferred embodiment is shown in FIG. 18. It is identical in operation, as the first preferred embodiment illustrated in FIGS. 7 and 8 with the only difference being the absence of the universal vehicle fit body 72. This third embodiment has the control circuit 181 suspended within body cavity 183 of standard metal bayonet base 182. Its operation differs from that of the prior art in that all LED's illuminate when used in either the tail lamp mode or the brake lamp mode, and, through the use of control circuitry, brake lamp intensity is greater than tail lamp intensity.

Figure 19:
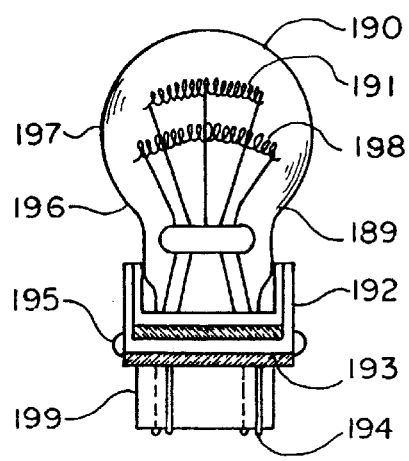
FIG. 19 is a perspective view of a standard wedge base electric incandescent lamp typically used in vehicles.

Recently wedge-based electric incandescent lamps similar to that depicted in FIG. 19 have been used on vehicles. Its functions are identical to that in FIG. 1. The only difference is in the physical shape. It has a glass envelope 190 that encases the tungsten tail lamp element 191 and brake element 198. The glass envelope diameter is about one inch at its widest point 197 at a location about 0.7 to 0.8 inch up from the top of the plastic base or clip 192. The narrow end of the said glass envelope fits down into the said base or clip. The glass envelope tapers out from the top of the said base or clip 189 at an angle of about 22 degrees. At point 196 about 0.35 inch out the glass envelope diameter equals the width of the top of said base or clip and continues on to maximum diameter of one inch at 197 about 0.7 to 0.8 inch. Vehicle lamp sockets are designed to accommodate the dimensions of the wedge based bulb. Some vehicle applications recess part of the glass envelope in the socket when installed for various reasons as shown in FIG. 6.

Figure 28:
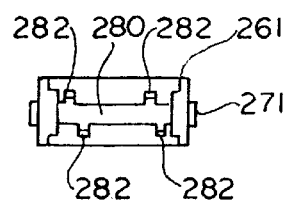
FIG. 28 is a top view of the retaining clip for the fifth embodiment.

Reference number 192 denotes either a one piece plastic base with the wedge 199 being part of it or it can denote a separate clip where 199 is actually part of the glass envelope that is pressed flat into a wedge that passes through said hollow clip similar to 261 in FIG. 28.

The standard wedge in either case is about 0.625 inch wide by about 0.1 inch thick by about 0.333 inch long. The bulb FIG. 19 is held into its vehicle socket by two opposite tapered side tabs 195 and two opposite tapered horizontal front and back ridges 193.

Figure 23:
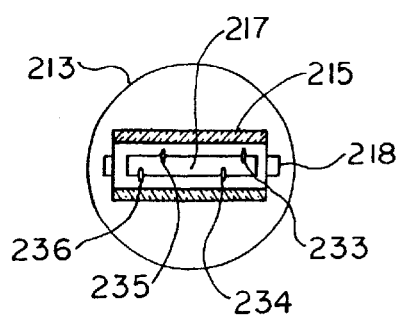
FIG. 23 is a bottom view of the fourth embodiment of the present invention.

Four wire conductors 194 extend out of the bottom of the wedge 199. The outer two are connected to the brake or turn filament and the inner two are connected to the tail filament. They are spaced to match the standard vehicle socket. The turn signal bulb does not have the inner two wires or filament 191 but is otherwise the same. The wires 194 are alternately folded back against the wedge parallel to each other as shown in FIGS. 23 and 19.

Figure 20:
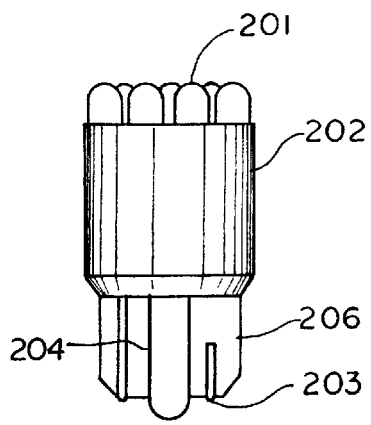
FIG. 20 is a perspective view of a prior art wedge base LED bulb housing.

The wedge base described in U.S. Pat. No. 5,160,200 illustrated in FIG. 20 is physically limited for vehicle lamp use because the base design 206 and central leg 204 will not allow it to fit the standard socket connector designed for base 192 of FIG. 19. It is not geometrically provided for to replicate the existing vehicle incandescent bulbs FIG. 19. Having a cylindrical portion 202, the width 201 can not equal the incandescent bulb 197 and therefore limits the brightness and usefulness. It has no side tabs 195 or horizontal ridges 193 to hold it into a socket.

Figure 21:
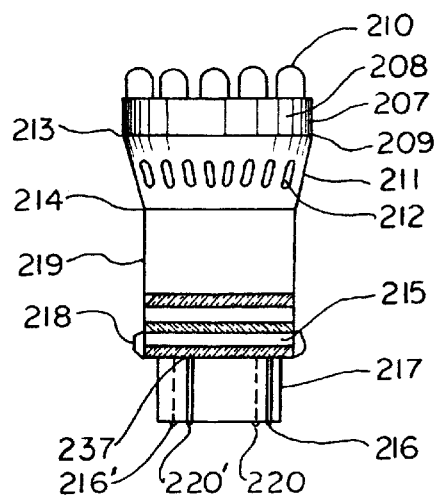
FIG. 21 is a perspective view of a fourth embodiment of the present invention showing a wedge base LED bulb which will fit into standard automotive wedge type brake/tail/turn lamp sockets.
Figure 22:
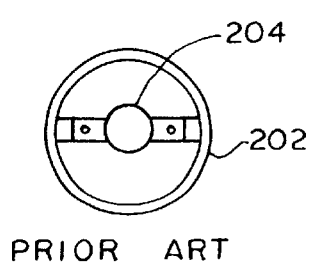
FIG. 22 is a bottom view of a prior art wedge base LED bulb housing.

A side view of the fourth preferred embodiment is shown in FIG. 21. It is a wedge based vehicle LED lamp module to replace the incandescent brake/tail and turn lamp in FIG. 19. It is identical in electrical operation to the first and second embodiments. The body is shaped to replicate the prior art incandescent bulb. The hollow funnel shaped body 211 is about one inch diameter at the top 213 where it flattens out and extends and additional 0.2 inches to encase printed circuit board 207 having top side 208 and bottom side 209 wherein a plurality of LED's 210 which are mounted on said top side of said printed circuit board as in the prior embodiments. This size is the same as the maximum diameter of prior art bulb illustrated in FIG. 19. Wedge base 217 of FIG. 21 is about 0.625 inch wide by 0.1 inch thick by 0.333 long. It has four bores 233, 234, 235, 236 through the length of the wedge as shown is FIGS. 21 and 23. As shown in the bottom view of FIG. 23 four wire conductors 216, 216', and 220, 220' extend out of the base. The bores are positioned to match those in base 192 of the prior art incandescent bulb of FIG. 19. The outer two wires 216 and 216' and inner two wires 220, and 220' are alternately folded back against the wedge base 217 and are parallel to each other and are held in place on opposite sides of said wedge base by receivers 237, where said receivers are slots in said base of a size to accommodate said wires. The two opposite tapered side tabs 218 and the two opposite tapered front and back ridges 215 hold the embodiment in a vehicle lamp socket. Body 219 has the same 0.77 inch width as prior art base 192 for a distance of about 0.66 inch from the top of each side tabs 218 to a point 214. At this point, the body begins to taper out at about 22 degrees with respect to the vertical and transforms from a wedge to a funnel shaped hollow body that extends to transition point 213 where it is a diameter of about one inch. These described dimensions keep this embodiment within the dimensional limits of the prior art bulb shown in FIG. 19 so it will fit all vehicle applications including those where part of the glass envelope is recessed in the socket similar to that described in FIG. 6. The positions and dimensions of the tabs, ridges, tapers, wedges, and conductors are identical to those of standard incandescent bulbs as described in the prior art FIG. 19. Air holes 212 provide for convective air cooling of the control circuitry and LED's to prevent loss of brightness over time.

Figure 24:
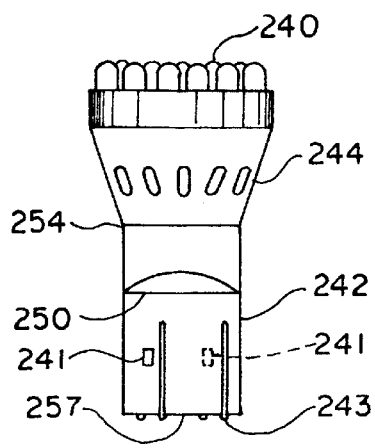
FIG. 24 is a perspective side view of a fifth embodiment of the present invention showing a wedge base LED bulb with a separate retaining clip which will fit into standard automotive wedge type brake/tail/turn lamp sockets.
Figure 25:
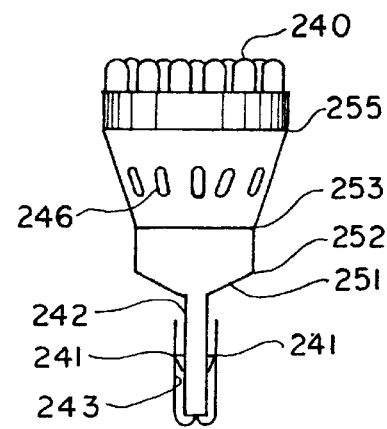
FIG. 25 is perspective edge view of the fifth embodiment.

Referring now to FIGS. 24 through 28, front and side views of a fifth preferred embodiment are shown in FIGS. 24 and 25 respectively. This embodiment is identical in operation and function as the forth-preferred embodiment. The plastic 244 body is essentially the same also with the main difference being it is a two piece body where the fourth-preferred embodiment is a single piece.

Figure 26:
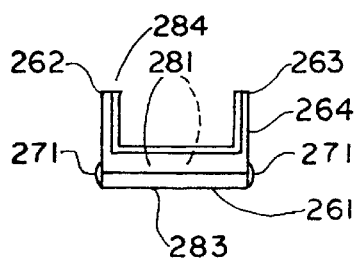
FIG. 26 is a side view of the retaining clip used for bulb body of the fifth embodiment.
Figure 27:
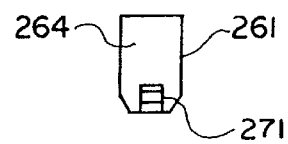
FIG. 27 is an edge view of the retaining clip for the fifth embodiment.

Retaining clip 261 with first portion 283 and protruding portion 284 is shown in FIGS. 26, 27, and 28. Its function is to hold the bulb in its vehicle socket by two opposite tapered side tabs 271 and two opposite tapered horizontal front and back ridges 281 allowing it to fit in the standard vehicle wedge based bulb brake/tail and turn lamp socket. The width of the clip from point 262 to 263 is 0.77 inches. The thickness of each side tab 271 is about 0.05 inches out from each side 264. The width of each horizontal ridge 281 is 0.100 inches at the top and 0.188 inches at the base as it tapers out. The ridges 281 are 0.79 inches long. The rectangular opening 280 is about 0.63 inch by 0.1 inch to receive the wedge 242. The opening 280 has four grooves positioned and sized to accommodate the wire conductors 243.

The wire conductors 243 are folded back against the wedge 242 parallel to each other. The conductors 243 are thereby formed and positioned to receive the retaining clip. The retaining clip 261 is oriented to install on bulb wedge base 242 where the wedge fits into hole 280 at first part 283 and extends out of protruding second portion 284 and wire conductors 243 line up with grooves 282. The clip 261 is held in place by locking tabs 241 leaving 0.333 inch of wedge base 242 extending downward as positioned in FIG. 24. The clip 261 holds the conductors 243 in place. The flat wedge base 242 is about 0.625 inch wide by 0.1 inch thick and extends about 0.575 inch from the bottom 257 to the top 250. At that point it begins to taper out at about a 50-degree angle 251 to form a 0.610 inch diameter cavity at point 252. At that point the body angle flattens out to about 2 to 3 degrees and continues upward for about 0.3 inch to point 253, At that point the body angle 254 changes to about 35 degrees and extends upward for about 0.4 inch to a maximum diameter of about one inch at point 255. At that point the body flattens back out and continues up another 0.2 to 0.3 inch to encase tile LED's 240, The funnel shaped hollow body 244 houses the control and circuitry described in FIGS. 9 and 11. A sectional view would indicate an inner slot similar to 104 to hold an optional vertical circuit card. Air holes 246 in tie funnel shaped portion allow convection air cooling of the LED's and circuitry to prevent loss of brightness over time. The plastic body 244 of the wedge base lamp embodiment provides for single and dual element socket connections 243 for use as brake/tail and turn signal applications.

Figure 29:
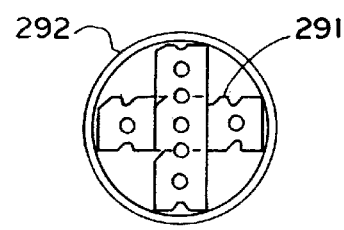
FIG. 29 is a top view of present invention showing high power four-leg automotive brake type LED's.
Figure 30:
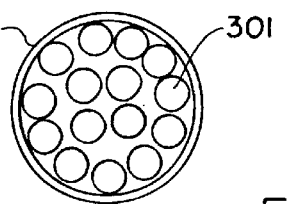
FIG. 30 is a top view of present invention showing standard T1 (3 mm) or T1 3/4 (5 mm) LED's.

FIGS. 29 and 30 show two of many different possible LED types and arrangements. FIG. 29 shows high power four-leg automotive type LED's 291 fitted in the same body 292 previously described in the preferred embodiments. FIG. 30 shows standard LED's 301 either size T1 (3 mm) or T1 ¾ (5 mm) fitted in the same body 302 previously described in the preferred embodiments.

FIG. 31 shows a side view of the viewing angle 313 of the light 312 shining from typical preferred embodiment 311 through the vehicle lamp assembly lens 314. A beam angle 313 of about 30 degrees is shown. This is variable from 3 degrees to 70 degrees and may be higher by selection of LED's.

FIG. 32 is a rear view of a typical vehicle's rear signal amp assembly lens 321 slowing a typical area 322 illuminated by any of the preferred embodiments. The surrounding area 323 is dimmer than the illuminated area. The viewing angle, brightness, number, and alignment of the LED's in all the embodiments determine the illumination area and pattern 322.

What is claimed is:

1. An LED light bulb adapted for use in standard automotive bayonet type bulb sockets in a brake light mode, a tail light mode, and a turning light mode, comprising:

a printed circuit board having an upper side and a lower side;

a plurality of light emitting diodes mounted on said upper side of said printed circuit board and electrically coupled with said printed circuit board;

a body having a first end and a second end, a cavity within said body, said body being tapered from first end to second end, said first end being larger than said second end, with the lower side of said printed circuit card attached to said first end of said body;

a base having a sidewall, a distal end and a proximal end, the sidewall having two alignment pins thereon, the proximal end attached to the second end of said body, the distal end having at least one contact; and electrical control means electrically connected between first and second contacts on said base and said printed circuit board, whereby when an electrical signal is supplied to said contacts said electrical control means transmits a processed electrical current enabling said light emitting diodes to be energized and emit light, wherein the electrical control means causes all light emitting diodes to illuminate when used in either the tail lamp mode or the brake lamp mode, and causes the individual light emitting diodes' intensity to be greater when in brake lamp mode than when in tail lamp mode.

2. An LED light bulb as in claim 1 wherein said body contains a plurality of cooling holes.

3. An LED light bulb as in claim 1 wherein said electrical control means comprises a resistor.

4. An LED light bulb as in claim 1 wherein electrical control means comprising a resistor electrically connected between said first contact and said printed circuit board and a resistor-diode series combination electrically connected between said second contact and printed circuit board.

5. An LED light bulb adapted for use in standard automotive wedge type bulb sockets in a brake light mode, a tail light mode, and a turning light mode, having electrical contacts therein comprising:

a printed circuit board having an upper side and a lower side;

a plurality of light emitting diodes mounted on said upper side of said printed circuit board and electrically coupled with said printed circuit board;

a body having a first end and a second end, a cavity within said body, said body being tapered from the first end to second end, said first end being larger than said second end, said second end terminating in a wedge shaped portion, said wedge shaped portion having a plurality of bores therein extending from said cavity to the exterior of said wedge shaped portion at the second end of said body and having retainers on the exterior sides of said wedge shaped portion;

electrical control means mounted within said cavity and electrically connected between said printed circuit board and at least one pair of electrical conductors, said electrical conductors extending through said bores exteriorly of said wedge shaped portion wherein conductors of each pair are folded exteriorly of said wedge shaped portion and fixed in said retainers on opposite sides of said wedge shaped portion such that electrical contact can be provided between said socket and externally protruding portions of said conductors when said wedge shaped portion is positioned within said socket, whereby when an electrical signal is supplied to said socket said electrical control means transmits a processed electrical current enabling said light emitting diodes to be energized and emit light, wherein all light emitting diodes illuminate when used in either the tail lamp mode or the brake lamp mode, and brake lamp intensity is greater than tail lamp intensity.

6. An LED light bulb as in claim 5 wherein said electrical control means comprises a resistor electrically connected between said printed circuit board with a second lead of a pair of leads connected to said printed circuit board and a resistor-diode series element electrically connected to one of a pair of leads with the second lead of said pair being connected to said printed circuit board.

7. An LED light bulb as in claim 5 wherein said body contains a plurality of cooling holes.

8. An LED light bulb as in claim 5 wherein said electrical control means comprises a resistor electrically connected between said first contact and said printed circuit board and a resistor-diode series combination electrically connected between said second contact and printed circuit board.

9. An LED light bulb adapted for use in standard automotive wedge type bulb sockets in a brake light mode, a tail light mode, and a turning light mode, comprising:

a printed circuit board having an upper side and a lower side;

a plurality of light emitting diodes mounted on said upper side of said printed circuit board and electrically coupled with said printed circuit board;

a body having a first end and a second end, a cavity within said body, said body being tapered from the first end to the second end, said first end being larger than said second end, said second end terminating in a wedge shaped portion, said wedge shaped portion having a plurality of bores therein extending from said cavity to the exterior of said wedge shaped portion at the second end of said body with retainers on the exterior sides of said wedge shaped portion;

electrical control means mounted within said cavity electrically connected between said printed circuit board and at least one pair of electrical conductors, said electrical conductors extending through said bores exteriorly to said wedge shaped portion wherein conductors of each pair are folded exteriorly to said wedge shaped portion and fixed in said retainers on opposite sides of said wedge shaped portion;

an electrically insulating base member including a first portion having an opening therein and a protruding second portion adjacent said first portion for being within a socket having electrical conductors thereon, said wedge shaped portion being securely positioned within said opening, said first portion of said base member thereby providing a cover for each of the externally projecting portions of said conductors passing through said protruding second portion and protruding exteriorly thereof, said first portion of said insulting base member including means for maintaining the externally protruding portions in a predetermined alignment within said first portion and against said protruding second portion such that electrical contact can be provided between said socket and said externally protruding portions of said conductors when said second portion is positioned within said socket, wherein all light emitting diodes illuminate when used in either the tail lamp mode or the brake lamp mode, and brake lamp intensity is greater than tail lamp intensity.

10. An LED light bulb as in claim 9 wherein said body contains a plurality of cooling holes.

11. An LED light bulb as in claim 9 wherein said electrical control means comprises a resistor electrically connected between a first conductor and said printed circuit board and a resistor-diode series combination electrically connected between a second conductor and printed circuit board.

12. An LED light bulb adapted for use in standard automotive bayonet type bulb sockets in a brake light mode, a tail light mode, and a turning light mode, comprising:

a printed circuit board having an upper side and a lower side;

a plurality of light emitting diodes mounted on said upper side of said printed circuit board and electrically coupled with said printed circuit board;

a base having a sidewall, a distal end and a proximal end, a cavity, the sidewall having two alignment pins thereon, the proximal end attached to said printed circuit board, the distal end having at least one contact; and electrical control means positioned within said cavity electrically connected between first and second contacts on said base and said printed circuit board, said lower side of said printed circuit board being attached to said proximal end of said base, whereby when an electrical signal is supplied to said contacts said electrical control means transmits a processed electrical current enabling said light emitting diodes to be energized and emit light, wherein the electrical control means causes all light emitting diodes to illuminate when used in either the tail lamp mode or the brake lamp mode, and causes the individual light emitting diodes' intensity to be greater when in brake lamp mode than when in tail lamp mode.

13. An LED light bulb as in claim 12 wherein said electrical control means comprises a resistor electrically connected between said first contact and said printed circuit board and a resistor-diode series combination electrically connected between said second contact and printed circuit board.

14. An LED light bulb adapted for use in standard automotive bayonet type bulb sockets comprising:

a printed circuit board having an upper side and a lower side;

a plurality of light emitting diodes mounted on said upper side of said printed circuit board and electrically coupled with said printed circuit board;

a body having a first end and a second end, a cavity within said body, said body being tapered from first end to second end, said first end being larger than said second end, with the lower side of said printed circuit card attached to said first end of said body;

a base having a sidewall, a distal end and a proximal end, the sidewall having two alignment pins thereon, the proximal end attached to the second end of said body, the distal end having at least one contact; and electrical control means electrically connected between at least one contact on said base and said printed circuit board, whereby when an electrical signal is supplied to said contact said electrical control means transmits a processed electrical current enabling said light emitting diodes to be energized and emit light, wherein said electrical control means comprises means for producing a series of electrical pulses mid applying said electrical pulses to said printed circuit board when an electrical signal is applied to a contact on said base.

15. An LED light bulb adapted for use in standard automotive wedge type bulb sockets having electrical contacts therein comprising:

a printed circuit board having an upper side and a lower side;

a plurality of light emitting diodes mounted on said upper side of said printed circuit board and electrically coupled with said printed circuit board;

a body having a first end and a second end, a cavity within said body, said body being tapered from the first end to second end, said first end being larger than said second end, said second end terminating in a wedge shaped portion, said wedge shaped portion having a plurality of bores therein extending from said cavity to the exterior of said wedge shaped portion at the second end of said body and having retainers on the exterior sides of said wedge shaped portion;

electrical control means mounted within said cavity and electrically connected between said printed circuit board and at least one pair of electrical conductors, said electrical conductors extending through said bores exteriorly of said wedge shaped portion wherein conductors of each pair are folded exteriorly of said wedge shaped portion and fixed in said retainers on opposite sides of said wedge shaped portion such that electrical contact can be provided between said socket and externally protruding portions of said conductors when said wedge shaped portion is positioned within said socket, whereby when an electrical signal is supplied to said socket said electrical control means transmits a processed electrical current enabling said light emitting diodes to be energized and emit light, wherein said electrical control means comprises means for producing a series of electrical pulses and applying said electrical pulses to said printed circuit board when an electrical signal is applied to said externally protruding portions of said conductors.

16. An LED light bulb adapted for use in standard automotive wedge type bulb sockets comprising:

a printed circuit board having an upper side and a lower side;

a plurality of light emitting diodes mounted on said upper side of said printed circuit board and electrically coupled with said printed circuit board;

a body having a first end and a second end, a cavity within said body, said body being tapered from the first end to the second end, said first end being larger than said second end, said second end terminating in a wedge shaped portion, said wedge shaped portion having a plurality of bores therein extending from said cavity to the exterior of said wedge shaped portion at the second end of said body with retainers on the exterior sides of said wedge shaped portion;

electrical control means mounted within said cavity electrically connected between said printed circuit board and at least one pair of electrical conductors, said electrical conductors extending through said bores exteriorly to said wedge shaped portion wherein conductors of each pair are folded exteriorly to said wedge shaped portion and fixed in said retainers on opposite sides of said wedge shaped portion;

an electrically insulating base member including a first portion having an opening therein and a protruding second portion adjacent said first portion for being within a socket having electrical conductors thereon, said wedge shaped portion being securely positioned within said opening, said first portion of said base member thereby providing a cover for each of the externally projecting portions of said conductors passing through said protruding second portion and protruding exteriorly thereof, said first portion of said insulting base member including means for maintaining the externally protruding portions in a predetermined alignment within said first portion and against said protruding second portion such that electrical contact can be provided between said socket and said externally protruding portions of said conductors when said second portion is positioned within said socket, wherein said electrical control means comprises means for producing a series of electrical pulses and applying said electrical pulses to said printed circuit board when an electrical signal is applied to said externally protruding portions of said conductors.

* * * * *